US007382752B2

(12) United States Patent
Melhuish

(10) Patent No.: US 7,382,752 B2
(45) Date of Patent: Jun. 3, 2008

(54) APPARATUS, AND AN ASSOCIATED METHOD, FOR COMMUNICATING TEXT DATA IN A RADIO COMMUNICATION SYSTEM

(75) Inventor: Ian Melhuish, Orangeville (CA)

(73) Assignee: Research In Motion, Waterloo (CA)

( * ) Notice: Subject to any disclaimer, the term of this patent is extended or adjusted under 35 U.S.C. 154(b) by 695 days.

(21) Appl. No.: 10/832,473

(22) Filed: Apr. 26, 2004

(65) Prior Publication Data

US 2005/0237980 A1    Oct. 27, 2005

(51) Int. Cl.
*H04B 7/216* (2006.01)
(52) U.S. Cl. ................ 370/335; 379/52; 455/414.1
(58) Field of Classification Search ............... 370/216, 370/217, 218, 338, 389, 422; 379/52; 455/414.1, 455/412.1, 432.2, 437, 524
See application file for complete search history.

(56) References Cited

U.S. PATENT DOCUMENTS 5,577,087 A * 11/1996 Furuya ..................... 375/377
5,956,651 A    9/1999 Willkie et al.

2003/0053603 A1    3/2003 Vejlgaard

OTHER PUBLICATIONS

Dorbecker et al., "The cellular text telephone modem—The sloution for supporting text telephone functionality in GSM networks.", May 2001, Acoustics, Speech and Signal Processing, 2001. Proceedings. (ICASSP '01). 2001 IEE International Conference on, vol. 3, Iss., 2001, pp. 1441-1444.*
Universal Mobile Telecommunications System (UMTS); Global text telephony; Transport of text in the voice channel (3GPP TS 26.226 version 5.0.0 Release 5); ETSI TS 126 226; ETSI Standards, European Telecommunications Standards Institute, Sophia-Antipo, Fr. Mar. 2001.

* cited by examiner

*Primary Examiner*—Rafael Perez-Gutierrez
*Assistant Examiner*—Abdias Mondesir

(57) ABSTRACT

Apparatus, and an associated method, for facilitating communication of text data, such as TTY data formed at a mobile node. The mobile node includes a TTY text generator together with mobile station circuitry, operable in a cellular radio communication system. The mobile node provides for CTM (Cellular Text Mode) modulation of the text data. If a connection is formable with the network part of the cellular communication system by which to communicate CTM-modulated data, the text data is sent as CTM-modulated. If such a connection is not formable, detection is made of the failure of the connection, and selection is made to communicate the text data as TTY-modulated data.

8 Claims, 5 Drawing Sheets

APPARATUS, AND AN ASSOCIATED METHOD, FOR COMMUNICATING TEXT DATA IN A RADIO COMMUNICATION SYSTEM

The present invention relates generally to a manner by which to send text data, such as TTY (Text Telephony) data, in a cellular, or other, radio communication system. More particularly, the present invention relates to apparatus, and an associated method, by which to facilitate communication of TTY data generated at an internal TTY device embodied at a mobile node, such as a mobile node operable pursuant to a 3GPP (Third Generation Partnership Project) operating specification.

When the communication network to which the mobile node is to send the text data is capable of forming a connection by which to communicate CTM (Cellular Text Modulation) modulated data, the text data sourced at the internal TTY device is sent as CTM-modulated data. If, however, a connection by which to communicate the CTM-modulated data is unable to be formed, a connection by which to communicate the text data, sourced at the internal TTY device, as TTY (Text Telephony) modulated data is instead formed, and the text data is communicated as TTY-modulated data. Text data is best communicated as CTM-modulated data. But, if a connection is unable to be formed by which to communicate CTM-modulated data, a connection is formed to permit the communication of TTY-modulated data, thereby still to communicate the text data. The TTY modulation operates as a fallback mode of operation of the mobile node in the event that the internally-sourced TTY text data is unable to be communicated as CTM-modulated data.

BACKGROUND OF THE INVENTION

The use of communication systems through which to communicate is pervasive throughout modern society. And, the need to have access to a modern communication system through which to communicate is therefore a common requirement for many. Various different types of communication systems have been developed and have been deployed through which to communicate data to effectuate varied types of communication services.

A communication system is formed, at a minimum, of a sending station and a receiving station, interconnected together by way of a communication channel. Data that is to be communicated to effectuate a communication service through operation of a communication system is sourced at, or is otherwise provided to, the sending station. The sending station converts, if necessary, the data into a form to permit its communication upon the communication channel and causes the data to be communicated thereon. The receiving station operates to detect the data communicated upon the communication channel and delivered to the receiving station and to operate upon the data once received thereat to recover the informational content thereof.

A telephonic communication system is an exemplary type of communication system. Usage of a telephonic communication system through which to communicate telephonically is pervasive. And, telephonic communication systems have been deployed, now to encompass a significant portion of the populated areas of the world. Generally, a telephonic communication system provides for the communication of both voice data and non-voice data. Two-way, full duplex communication of the data is usually provided by a telephonic communication system.

Users communicate by way of a telephonic communication system by way of communication stations referred to as telephonic stations. A telephonic station at which a call is initiated is referred to as a calling station or calling party. And, a telephonic station to which a call is placed is referred to as a called station or called party.

A radio telephonic communication system, such as a cellular communication system, also provides for telephonic communication of voice and non-voice data. The data is communicated by way of channels defined upon a radio air interface, obviating the conventional requirement that the telephonic stations be fixedly connected to wireline connections to permit the communication of data to effectuate a communication service. Because the need for the wireline connection is obviated, user mobility during communication operations is enhanced.

Additionally, telephonic stations, typically referred to as mobile stations, used in a radio telephonic communication system, are typically of dimensions permitting their carriage by a user. The use of radio links, and radio channels defined thereon, together with the ease of carriage of the mobile stations, permits the user of a mobile station to communicate telephonically from, and between, locations at which telephonic communications had previously not been feasible.

Conventional, wireline telephonic stations are sometimes adapted to include, or to permit the connection thereto, of data text devices, such as TTY devices. TTY devices permit telephonic communications to be effectuated by, e.g., hearing-impaired users. A hearing-impaired user is generally less able, or unable, to hear voice data delivered to a telephonic station and, sometimes, is unable adequately orally to communicate voice information. To compensate for this impairment, a user enters data that is to be communicated by way of the TTY device, and a recipient of the data receives the transmitted data in textual form.

The TTY devices were developed initially for their use in wireline telephonic systems. Their adaptation for use in radio telephonic communication systems is non-ideal, particularly when the radio telephonic communication system forms a digital communication system. A primary reason for this is that digital radio telephonic communication systems regularly utilize speech coding techniques to encode data prior to its communication upon radio channels defined upon a radio air interface. Speech coders are generally optimized to encode speech-like signals, not textual data. And, transmission errors during communication upon non-ideal communication channels are sometimes also more problematical when textual data rather than speech data is communicated. Modulation techniques, and modems that carry out such modulation techniques, conventionally utilized by TTY devices were not developed to take into account coding performed by speech coders to which a TTY device, and the TTY data generated thereat, passes when connected theretogether.

A CTM (Cellular Text Telephone Modem) scheme has been proposed that provides an improved manner by which to communicate text data. And, radio telephonic communication system apparatus, both for the infrastructure part of the system and for a mobile station operable therein, is being developed to facilitate the communication of CTM-modulated data.

Schemes are set forth by which to provide TTY modulation at an external TTY device that is connected to a radiotelephonic station, herein referred to as a mobile node, in the event that CTM modulation can not be performed. But, mobile nodes are now constructed to include internal TTY devices, or applications. And, the text data formed at the internal device is applied directly to a CTM modulator of the mobile node. If a connection is able to be formed to communicate the text data, to form CTM-modulated data, the data is communicated.

The existing scheme, however, generally fails to provide a manner by which to communicate the internally-sourced textual data in the event that a connection is unable to be formed to communicate the CTM-modulated textual data. In the event that such a connection is unable to be formed, presently, there is generally no standard procedure by which to ensure that the textual data is communicated.

The inability of a user to communicate the internally-sourced textual data is particularly problematic when the data is to be communicated pursuant to a request for emergency assistance, such as, in the United States and Canada, an emergency 911 call. A fallback technique by which to communicate the internally-sourced textual data in the event that CTM-modulated textual data cannot be communicated would, therefore, be advantageous.

It is in light of this background information related to the communication of textual data in a radio communication system that the significant improvements of the present invention have evolved.

SUMMARY OF THE INVENTION

The present invention, accordingly, advantageously provides apparatus, and an associated method, by which to send text data, such as TTY (Text Telephony) data sourced at an internal TTY terminal, in a cellular, or other, radio communication system.

Through operation of an embodiment of the present invention, a manner is provided by which to facilitate communication of the internally sourced TTY data generated at a mobile node, such as a mobile node operable pursuant to a 3GPP (Third Generation Partnership Project) operating specification.

The mobile node, constructed to be operable in conformity with the 3GPP operating specification, provides for CTM (Cellular Text Mode) modulation. When the communication network to which to mobile node is to send the internally sourced text data is also CTM-capable, a connection is formed between the mobile node and the network upon which to communicate CTM-modulated text data. As CTM modulation provides for efficient, and accurate, communication of the text data, CTM modulation is a preferred, and first attempted, manner by which to communicate the text data.

In the event that a connection by which to communicate CTM-modulated data is unable to be formed, e.g., when the CTM-capable mobile node attempts to communicate with a communication network that fails to provide for CTM-modulated communications, the communication attempt is not merely terminated, but, instead, TTY-modulation of the text data is carried out at the mobile node. A connection upon which TTY-modulated text data is communicated is formed, and the text data is communicated in TTY-modulated form. Thereby, even when the connection upon which CTM-modulated data cannot be formed, the text data is still communicated by the mobile node to the communication network. A communication service that is to be effectuated pursuant to the communication of the text data is thereby performed even when CTM-modulation is unavailable.

In one aspect of the present invention, TTY to CTM conversion is selectably performed at the mobile node. Text data, entered by a user of the mobile phone by way of an internal TTY device is converted into CTM-modulated data for communication by way of a connection with network infrastructure capable of handling CTM-modulated data. Detection, or other determination, of the formation of the connection permitting the communication of CTM-modulated data is made by the mobile node. If the connection is formed, or otherwise available, CTM-modulated data is communicated by way of the connection formed between the mobile node and the communication network. Detection of the formation of the connection or, conversely, the failure of the formation of the connection, is made by monitoring CTM negotiations between the mobile node and the communication network. In the event that failure of successful formation of the connection to permit the CTM-modulated data to be communicated, the text data is not converted into CTM-modulated data. Instead, a connection is formed between the mobile node and the communication network upon which TTY-modulated data is communicated, and a TTY modulator modulates the text data as TTY modulated data. While communication efficiencies of communication of TTY-modulated data are lessened in a digital radio telephonic communication network relative to communication of CTM-modulated data, communication of the data is still effectuable even if communication of CTM-modulated data is not able to be performed.

In another aspect of the present invention, selection is made to form a connection by which to communicate TTY-modulated data in the event that a connection is unable to formed by which to communicate CTM-modulated data. And, subsequent to a selection to form the connection upon which to communicate TTY-modulated data, the connection is formed, and the text data is communicated thereon as TTY-modulated data.

The connection upon which to communicate CTM-modulated data as well as the connection upon which to communicate TTY-modulated data are formed on speech channels defined in the radio telephonic communication system. And, the modulated data, whether TTY-modulated data or CTM-modulated data, is passed through a speech coder embodied at the mobile node that is used also for coding speech or voice data.

Because the text data is communicated as TTY-modulated data in the event that a connection by which to communicate the data as CTM-modulated data is unable to be formed, the communication of the text data is not terminated merely due to failure to form the connection permitting communication of the CTM-modulated data. In the event that the text data is to be communicated pursuant to a request for emergency assistance, such as pursuant to an emergency 911 call in the United States, communication of the essential information is more likely to be effectuated. Improved communication possibilities are thereby provided.

In these and other aspects, therefore, apparatus, and an associated method, is provided for a radio telephonic communication system. The system has a network part with which a mobile node communicates by way of a radio link. The mobile node is operable at least to send data signals representative of text data to a destination. Communication of the signals representative of the text data is facilitated. The text data is selectably modulated in a first manner to be communicated pursuant to a first connection with the destination. And, the text data is selectably modulated in a second manner to be communicated pursuant to a second connection with the destination. A detector is embodied at the mobile node. The detector at least detects failure of formation of the first connection, absence of the formation of which prevents communication of the signals representative of the text data when modulated in the first manner. A selector is adapted to receive indications of detection made by the detector. The selector selects to form the second connection with the destination and to select modulation of the signals representative of the text data in the second manner. Thereby, communication of the signals representative of the text data is permitted, modulated in the second manner, by way of the second connection.

A more complete appreciation of the present invention and the scope thereof can be obtained from the accompanying drawings that are briefly summarized below, the following detailed description of the presently-preferred embodiments of the present invention, and the appended claims.

DETAIL DESCRIPTION

Figure 1:
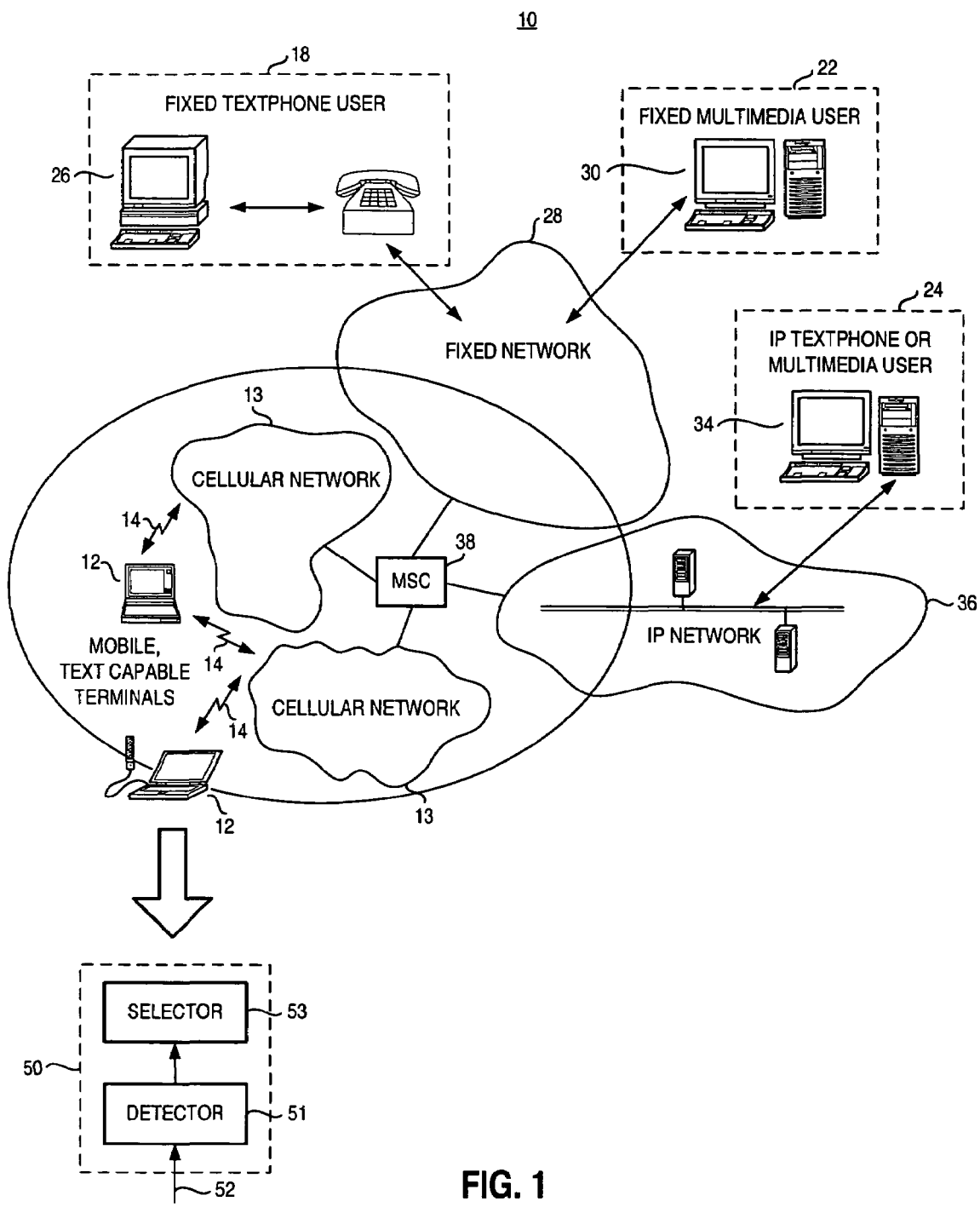
FIG. 1 illustrates a functional block diagram of a radio communication system in which an embodiment of the present invention is operable.

Referring first to FIG. 1, a radio communication system, shown generally at 10, provides for radio telephonic communication services with mobile nodes, of which the mobile nodes 12 are exemplary. When a mobile node operable in the radio communication system is within an area encompassed by the radio network part of the communication system, communication services are effectuable by, to, and between the mobile node and the radio access network, here represented by the cellular networks 13.

In the exemplary implementation, the radio access network part of the radio communication system and the mobile nodes capable of communicating therewith are constructed to be operable generally in conformity with a 3GPP (Third Generation Partnership Project) operating specification. While the following description shall be described with respect to the exemplary implementation in which the portions of the radio communication system form a cellular communication system operable pursuant to the 3GPP operating specification, the teachings of the present invention are also applicable to other types of cellular, and other radio telephonic, communication systems.

Data that is to be communicated by the network part of the communication system is communicated upon downlink channels defined upon a radio air interface extending between a mobile node and the network part. And, data to be communicated by a mobile node to the network part of the communication system is communicated upon uplink channels defined upon the radio air interface extending between the mobile node and the network part. In the figure, the arrows 14 are representative of the channels defined upon the radio air interface to effectuate the communication of data between the network part and the mobile node.

Various types of communication services are effectuable during operation of the radio communication systems. Amongst the communication services are communication services that are effectuable with users that are hearing-impaired, effectuable through use of text telephone (TTY) devices.

Use of TTY devices by which to enter, and display, text data is of particular interest to a user suffering from a hearing disability or otherwise is unable fully to communicate by voice communication. Such devices are, of course, also usable by others, as well. Many business and governmental entities, as well as individual and other private entities maintain text telephone (TTY) that form TTY destinations and TTY origination locations. When installed, such TTY devices permit communications to be effectuated between the locations at which the devices are installed and remote locations having corresponding text data capabilities. The stations 18, 22 and 24 are representative of locations at which TTY devices are located. A TTY device 26 positioned at the location 18 represents a fixed text phone connected to a fixed network 28. And, a TTY device embodied at the station 22 is representative of a fixed multi-media device 30 also connected to the fixed network 28. And, a TTY device 34 is representative of an IP text phone or multi-media device connected to an IP (Internet Protocol), or other packet data-based, network 36. The fixed network and the IP network 28 and 36 are connected to a radio access (i.e., cellular) network 13 by way of a mobile switching center/gateway mobile switching center (MSC/GMSC) 38. Through such connection, a communication path is formable between a mobile node 12 and any of the fixed locations 18, 22, and 24 at which text-capable devices are positioned.

The radio access network 13, here, a cellular network, includes entities normally capable of generating and detecting CTM (Cellular Text Mode)-modulated data. And, any of the mobile nodes 12 is also normally capable of sending and receiving CTM-modulated text data.

When text data is entered by a user of a mobile node 12 for communication to a destination, such as one of the devices 26, 30, or 34, a connection is formed by way of speech channels formed of uplink channels defined upon the radio air interface extending between the mobile node and the radio access network. And, within the radio access network, the CTM-modulated data is converted into a form to permit its communication through the fixed network or IP network, as appropriate, to be delivered to the appropriate destination. The connection by which to communicate the CTM-modulated data upon the uplink speech channels is formed responsive to a service negotiation. If, as a result of the service negotiation, a connection is formed, the CTM-modulated data is communicated as just described. However, if the connection is not formed, conventionally, the data is not communicated.

Pursuant to an embodiment of the present invention, a mobile node 12 further includes apparatus 50 of an embodiment of the present invention. The elements of the apparatus 50 are represented functionally as functional entities and are implementable in any desired manner. The apparatus 50 operates to facilitate communication of the text data even in the event that the connection upon which to communicate the CTM-modulated data cannot be formed. The apparatus includes a detector 51 that operates to detect whether the connection upon which to communicate CTM-modulated data is formed. Indicia is provided to the detector, here indicated by way of the line 52, to permit the detection to be made. The indicia is formed, for instance, of indications of the service negotiation performed by the radio access network and a mobile node by which to allocate the channels on the uplink to form the connection. The apparatus further includes a selector 53 that operates responsive to detections made by the detector 51. The selector is selectably operable to select to form an alternate connection by which to communicate TTY-modulated data. Selection is made to form the alternate connection in the event that the connection by which to communicate the CTM-modulated text data is not able to be formed. And, subsequent to selection by the selector to form the alternate connection, the connection is formed and the text data is communicated as TTY-modulated data.

Figure 2:
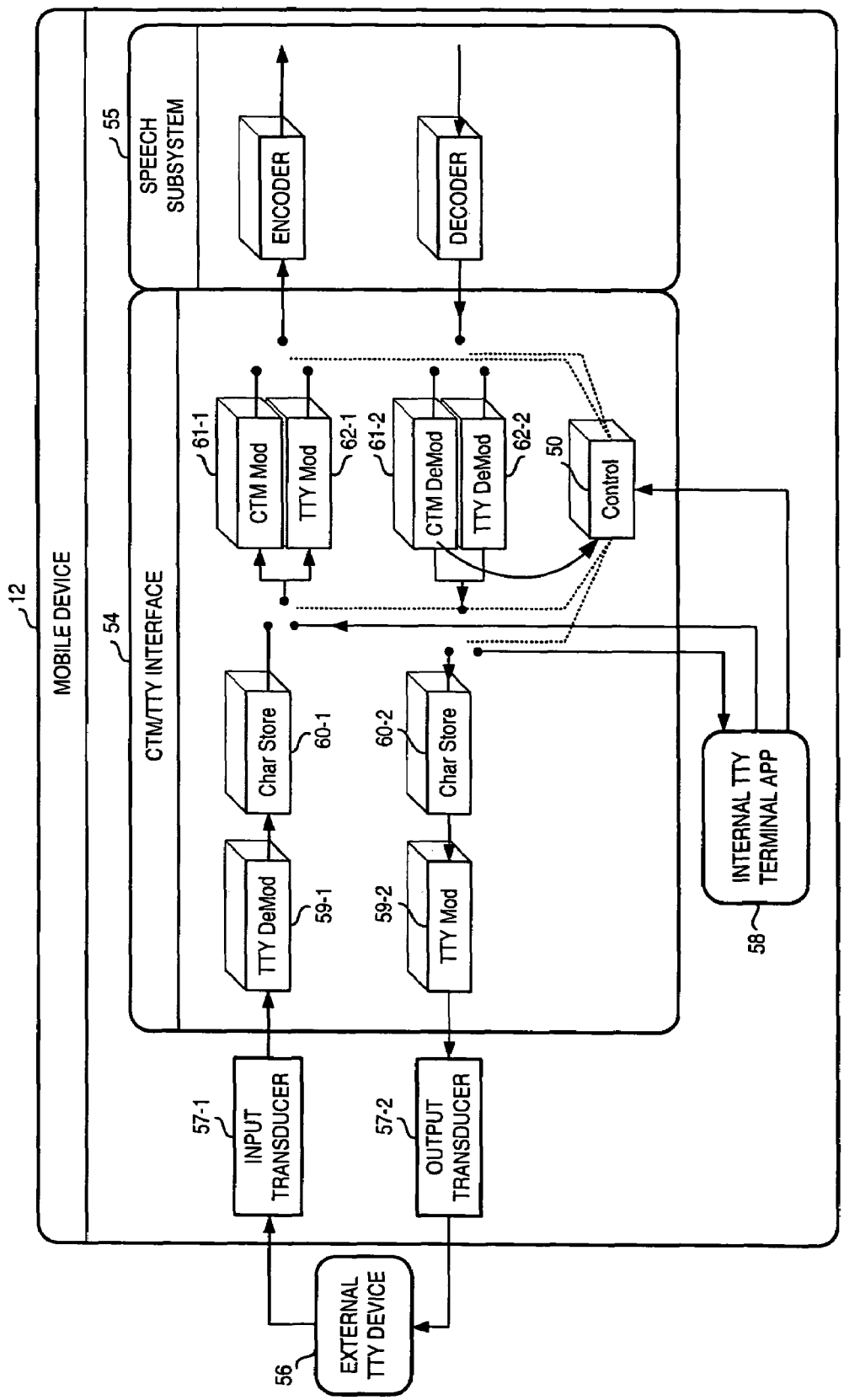
FIG. 2 illustrates a functional block diagram of a communication station at which text data is sourced for communication by way of a radio communication system.

FIG. 2 illustrates the mobile 12 that operates pursuant to an embodiment of the present invention. The mobile node includes a CTM/TTY interface 54 and a speech subsystem 55 coupled thereto. The apparatus 50 is coupled to, or forms a portion of, the interface. A conventional, external TTY device 56 is also shown in FIG. 2, connected to the interface 54 by way of input and output transducers 57-1 and 57-2. And, the mobile node is further shown to include an internal TTY terminal 58. When the external TTY device is operated, conventional operation of transducing the text data formed thereat is performed by the transducers 57. Input data is provided to the demodulator part 59-1 pf a TTY demodulator/modulator 59. A TTY modulator part 59-2 is also shown. And, the input data is provided to a character store 60-1 of a character store 60. A second character store 60-2 is also shown.

The interface also includes a modulator/demodulator part, here including a CTM modulator 61-1 and a CTM demodulator 61-2 and a TTY modulator 62-1 and a TTY demodulator 62-2. And, the modulator/demodulator part is connected to an encoder and decoder 63-1 and 63-2, respectively, of the speech subsystem 55.

When text data is sourced at the external TTY device, the data is provided to the modulator/demodulator, and modulation and demodulation is performed, as appropriate. Here, also pursuant to an embodiment of the present invention, text data sourced at the internal TTY device 58 is also provided to the modulator/demodulator part. Apparatus 50 of an embodiment of the present invention operates to cause the internally-sourced data either to be provided to the CTM modulator or the TTY modulator, depending upon whether CTM-modulated communications are effectuable. Reverse direction operation is analogous. If CTM-modulated communications are available, the internally-sourced data is applied to the CTM modulator. Otherwise, the apparatus causes the internally-sourced data to be TTY-modulated by the TTY modulator 62-1. Thereby, the internally-sourced text data is communicated as CTM modulated data if possible; otherwise that data is sent as TTY-modulated data.

Figure 3:
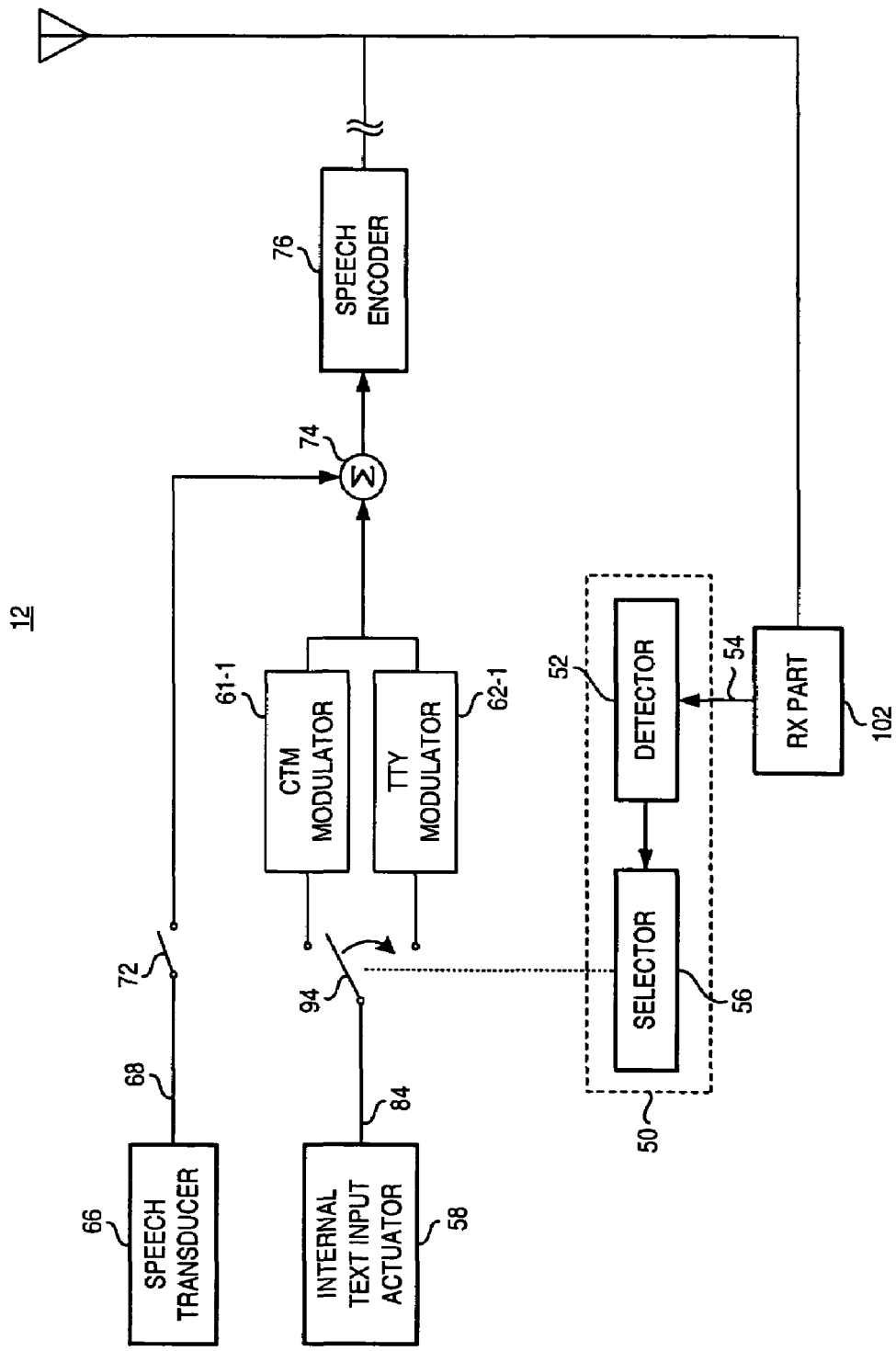
FIG. 3 illustrates a functional block diagram of portions of the radio communication system, shown in FIG. 1, in greater detail.

FIG. 3 illustrates portions of another exemplary mobile node 12 that includes the apparatus 50 of an embodiment of the present invention. In the exemplary implementation, the mobile node is formed of the TTY text device 58 integrated together with circuitry of a mobile station, capable of communicating with the radio access network part 13 (shown in FIG. 1). The entities illustrated in the figure, however, are functionally represented and are also representative of a mobile node formed of discrete devices, i.e., a discrete TTY device and a mobile station connected theretogether.

When the mobile node is utilized to communicate voice data, a user of the mobile node speaks into a microphone, here identified as a speech transducer 66. The speech transducer converts acoustic signals into electrical form on the line 68. A switch entity 72 is positioned in a closed position when the mobile node is operated in the speech mode and the speech data formed by the speech transducer is applied, by way of a summing element 74 to a speech encoder 76 to be encoded thereat and thereafter to other radio circuitry (not shown) to place the data in form for communication by way of speech channels defined upon the radio air interface.

When text data is to be communicated, the switch position of the switch element 72 is opened. The user of the mobile node enters text data through actuation of a text input actuator forming the text device 58. The text input actuator forms text data signals on the line 84 that are selectably CTM modulated by the modulator 61-1 or TTY modulated by the TTY modulator 62-1, depending upon the switch position of the switch 94. Selection made by the selector selects the switch position of the switch 94. Here, the selector also controls positioning of the switch 72. That is to say, in the exemplary implementation, the TTY-modulated text data or CTM modulated text data is alternately applied to the summing element 74.

When the data is applied to the modulator 61-1, CTM modulation is performed, and CTM-modulated text data is generated on the line 98 and applied to the summing element 74. When communication of CTM-modulated data is unavailable, the switch is positioned to acause the data to be TTY-modulated. When the mobile node is operated in the text mode, therefore, the text data that is to be communicated by the mobile node is alternately applied to the speech encoder as CTM-modulated text data or as TTY-modulated data.

Determination of in which form that the text data is applied to the speech encoder is made by the apparatus 50. Then, the apparatus 50 is shown to include the detector 52 and the selector 56. And, the line 54 upon which input indicia is provided to the detector is also again shown. Here, the line 54 extends from a receive part 102 of the mobile node. The receive part receives indications, e.g., of the results of service negotiations to form a connection to communicate CTM-modulated data. Operation of the apparatus is as described previously. If the detector detects that the connection upon which to communicate CTM-modulated data is not formed, the selector selects that the text data be sent in TTY-modulated form. The switch element 94 is closed and the text data is sent in TTY-modulated form.

Figure 4:
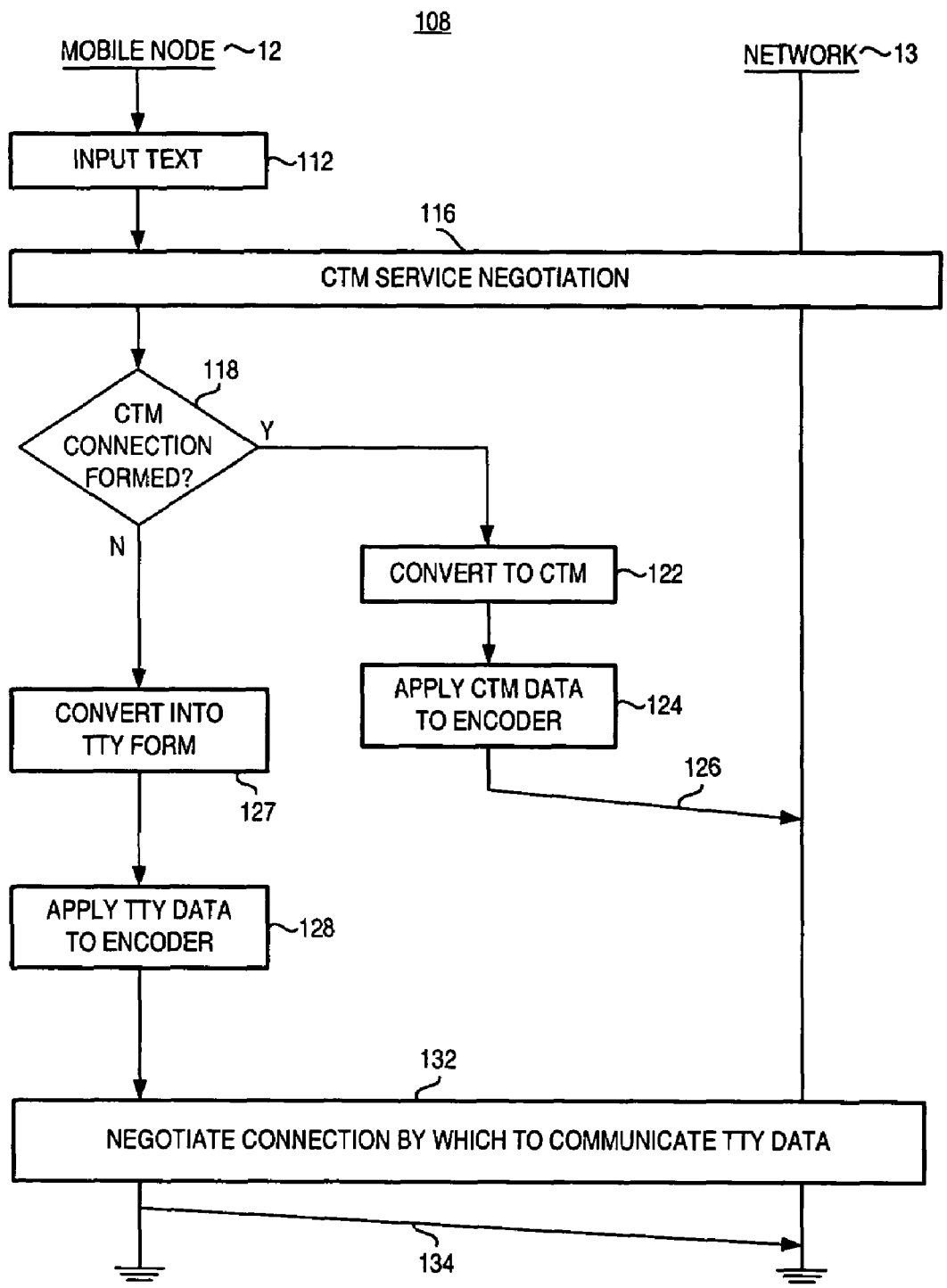
FIG. 4 illustrates a message sequence diagram representative of signaling generated during operation of the radio communication system shown in FIGS. 1-2.

FIG. 4 illustrates a message sequence diagram, shown generally at 108, representative of operation of the radio communication system 10 (shown in FIG. 1) during operation of an embodiment of the present invention. The mobile node 12 operates to send text data to the radio access network 13 so that the radio access network is able subsequently to forward on the text data to a destination. Text data is communicated pursuant to operation of an embodiment of the present invention even if CTM-modulated data is unable to be communicated. Communication of the text data to a destination, such as emergency dispatch center, is more likely to be effectuated as the text data is able to be communicated either as CTM-modulated data or as TTY-modulated data.

A user of the mobile node enters the text data, indicated by the block 112. When the data is to be communicated, the mobile node first attempts to form a connection with the radio access network by which to communicate CTM-modulated data. The connection is attempted during the CTM service negotiation indicated by the block 116.

A determination is made at the decision block 118 whether a CTM connection has been formed. If so, the "yes" branch is taken and the data is converted into CTM form, indicated by the block 122. And, the CTM-modulated data is applied to the speech encoder, indicated by the block 124. Thereafter, and as indicated by the segment 126, the data is sent to the radio access network.

If, conversely, the CTM connection is not formed, the "no" branch is taken from the decision block 118, the data is TTY-modulated, as indicated by the block 127, and the TTY-modulated data is applied, indicated by the block 128, directly to the speech encoder. A connection is formed, indicated by the block 132 upon which to communicate the TTY-modulated data, and the data is sent indicated by the segment 134.

Figure 5:
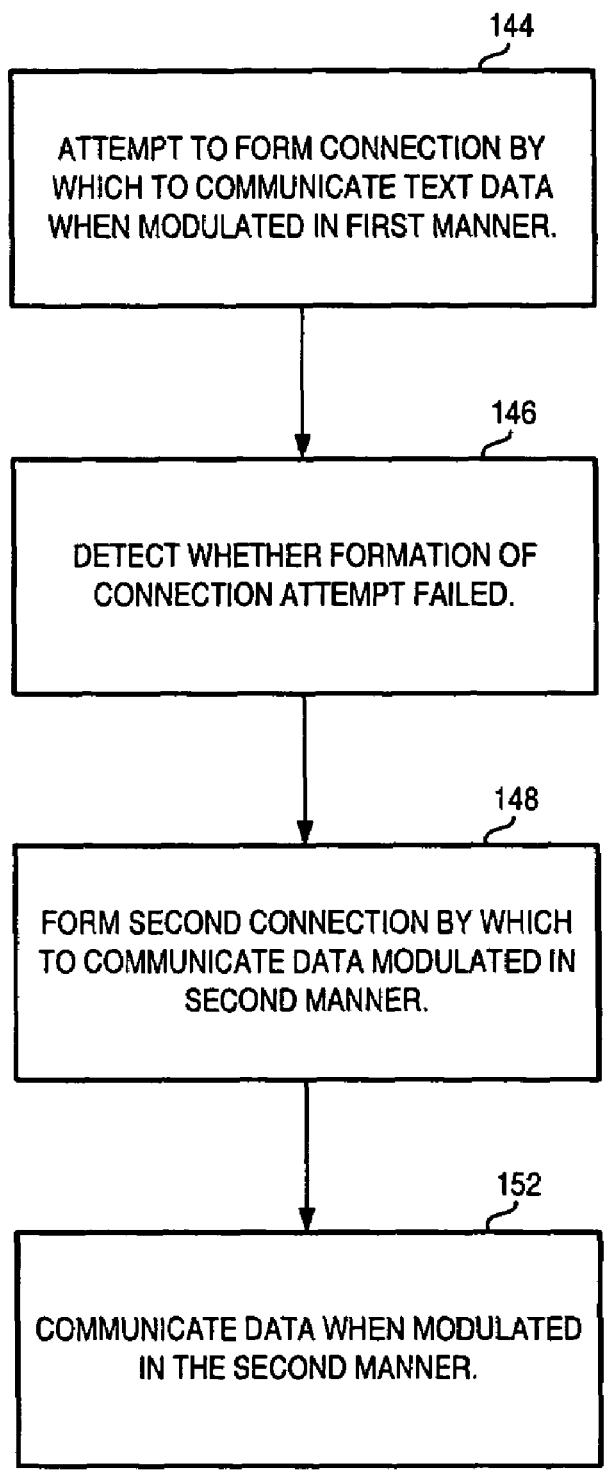
FIG. 5 illustrates a method flow diagram listing the method steps of the method of operation of the method of an embodiment of the present invention.

FIG. 5 illustrates a method flow diagram, shown generally at 142, representative of the method of operation of the method of an embodiment of the present invention. The method facilitates communication of text data to a destination. The text data is selectably modulated in a first manner to be communicated pursuant to a first connection and selectably modulated in a second manner to be communicated pursuant to a second connection with the destination.

First, and as indicated by the block 144, formation of a connection by which to communicate the text data when modulated in the first manner, is attempted. Then, and as indicated by the block 146, detection is made as to whether formation of the connection has failed. Absence of the formation prevents communication of the text data when modulated in the first manner.

Then, and as indicated by the block 148, selection is made to form the second connection to permit communication of the signals modulated in the second manner. And, as indicated by the block 152, the connection is formed, and the data is communicated, modulated in the second manner.

Thereby, even if the data is unable to be communicated when modulated in the first manner, an alternate connection is formed and the text data is sent in an alternate manner.

The previous descriptions are of preferred examples for implementing the invention, and the scope of the invention should not necessarily be limited by this description. The scope of the present invention is defined by the following claims.

The invention claimed is:

1. Apparatus for a mobile node that communicates by way of a radio link, the mobile node comprising a text telephony (TTY) device through which a user enters TTY data and a cellular mobile station operable to communicate pursuant to the radio telephonic communication system, the mobile node operable at least to send data signals representative of TTY data to a destination comprising a TTY station, said apparatus comprising:
   a cellular text modem (CTM) modulator selectably adapted to receive the TTY data that is to be communicated, said CTM modulator for modulating the TTY data pursuant to a CTM modulation scheme for communication to the destination by way of a first connection;
   a TTY modulator selectably adapted to receive the TTY data that is to be communicated, said TTY modulator for modulating the TTY data pursuant to a TTY modulation scheme for communication to the destination by way of a second connection;
   a detector embodied at the mobile node, said detector at least for detecting failure of formation of the first connection, absence of the formation of which prevents communication of the signals representative of the TTY data when modulated pursuant to the CTM modulation scheme by said CTM modulator; and
   a selector adapted to receive indications of detection made by said detector, said selector for selecting to form the second connection with the destination and to modulate the signals representative of the TTY data pursuant to the TTY modulation scheme by said TTY modulator, thereby to permit communication of the signals representative of the TTY data, modulated pursuant to the TTY modulation scheme, by way of the second connection;
   wherein the mobile node is initially operable to attempt to send the signals, representative of the TTY data entered through the TTY device by the user, by way of the first connection, said detector detecting failure of the formation of the first connection responsive to detection of a failed negotiation to form the first connection.

2. The apparatus of claim 1 wherein a speech channel is defined upon the radio link, wherein the first connection pursuant to which the signals representative of the TTY data are selectably communicated is made upon the speech channel, and wherein said detector detects failure of formation of the first connection upon the speech channel.

3. The apparatus of claim 1 wherein a speech channel is defined upon the radio link, wherein the second connection pursuant to which the signals representative of the TTY data are selectably communicated is made upon the speech channel, and wherein said selector selects formation of the second connection upon the speech channel responsive to determinations made by said detector.

4. The apparatus of claim 1 wherein the mobile node further comprises a speech encoder and wherein the first connection and the second connection both include the speech encoder, selection made by said selector to form the second connection to provide TTY-modulated signals representative of the TTY data to the speech encoder upon detection by said detector of failure of the first connection.

5. A method of communicating in a radio telephonic communication system having a mobile node that communicates by way of a radio link, the mobile node operable at least to send data signals representative of TTY data to a destination, said method comprising the operations of:
   attempting to form a first connection by which to send the signals representative of the TTY data;
   selectably modulating the TTY data pursuant to a cellular text modem (CTM) modulation scheme for communication to the destination by way of a first connection;
   selectably modulating the TTY data pursuant to a TTY modulation scheme for communication to the destination by way of a second connection;
   detecting failure of formation of the first connection, absence of the formation of which prevents communication of the signals representative of the TTY data when modulated pursuant to the CTM modulation scheme, wherein said operation of detecting failure of the formation of the first connection comprises detecting absence of response by the destination of a first-connection service negotiation; and
   selecting, responsive to detection of the failure of the formation of the first connection during said operation of detecting, to form the second connection with the destination and to modulate the signals representative of the TTY data pursuant to the CTM modulation scheme, thereby to permit communication of the signals representative of the TTY data, modulated pursuant to the TTY modulation scheme, by way of the second connection.

6. The method of claim 5 wherein the radio communication system defines a speech channel upon the radio link, wherein the first connection pursuant to which the signals representative of the TTY data are selectably communicated is made upon the speech channel and wherein said operation of detecting comprises detecting failure of formation of the first connection upon the speech channel.

7. The method of claim 5 wherein the radio communication system defines a speech channel upon the radio link, wherein the second connection pursuant to which the signals representative of the TTY data are selectably communicated is made upon the speech channel.

8. A method of communicating in a radio telephonic communication system defining a speech channel upon the radio link and having a mobile node that communicates by way of a radio link, the mobile node operable at least to send data signals representative of TTY data to a destination, said method comprising the operations of:

selectably modulating the TTY data pursuant to a cellular text modem (CTM) modulation scheme for communication to the destination by way of a first connection;

selectably modulating the TTY data pursuant to a TTY modulation scheme for communication to the destination by way of a second connection;

attempting to form the first connection on a speech channel by which to send the signals representative of the TTY data;

detecting, subsequent to attempting to form the first connection, failure of formation of the first connection upon the speech channel comprising absence of response by the destination of a first-connection service negotiation, wherein absence of the formation of the first connection prevents communication of the signals representative of the TTY data when modulated pursuant to the CTM modulation scheme; and selecting, responsive to detection of the failure of the formation of the first connection during said operation of detecting, to form the second connection with the destination and to modulate the signals representative of the telephony text data pursuant to the CTM modulation scheme, thereby to permit communication of the signals representative of the TTY data, modulated pursuant to the TTY modulation scheme, by way of the second connection.

* * * * *

UNITED STATES PATENT AND TRADEMARK OFFICE
CERTIFICATE OF CORRECTION

PATENT NO. : 7,382,752 B2  Page 1 of 1
APPLICATION NO. : 10/832473
DATED : June 3, 2008
INVENTOR(S) : Ian Melhuish It is certified that error appears in the above-identified patent and that said Letters Patent is hereby corrected as shown below:

Title Page, Item (73) Assignee:
Delete "Research in Motion" and replace with, -- Research in Motion Limited --.

Signed and Sealed this

Twentieth Day of January, 2009

JON W. DUDAS
*Director of the United States Patent and Trademark Office*